United States Patent [19]

Godyak et al.

[11] Patent Number: 5,027,041
[45] Date of Patent: Jun. 25, 1991

[54] INTEGRATED RADIO-FREQUENCY LIGHT SOURCE FOR LARGE SCALE DISPLAY

[75] Inventors: Valery Godyak, North Andover; Iosif Sheynberg, Lynn, both of Mass.

[73] Assignee: GTE Products Corporation, Danvers, Mass.

[21] Appl. No.: 466,103

[22] Filed: Jan. 16, 1990

[51] Int. Cl.⁵ .............................................. H05B 41/16
[52] U.S. Cl. ..................................... 315/248; 315/344
[58] Field of Search ..................... 315/248, 39, 169.4, 315/267, 219, 344; 362/367, 184

[56] References Cited

U.S. PATENT DOCUMENTS

| 3,196,312 | 7/1965 | Marrison | 315/248 |
| 3,500,118 | 3/1970 | Anderson | |
| 3,600,712 | 8/1971 | Williamson | 315/248 |
| 3,997,816 | 12/1976 | Haugsjaa et al. | |
| 4,095,142 | 6/1978 | Murayama | 315/248 |
| 4,266,167 | 5/1981 | Proud | 315/39 |
| 4,427,920 | 1/1984 | Proud | 315/39 |
| 4,427,921 | 1/1984 | Proud et al. | |
| 4,427,925 | 1/1984 | Proud | 315/39 |
| 4,559,480 | 12/1985 | Nobs | |
| 4,647,821 | 3/1987 | Lapatovich et al. | |
| 4,649,322 | 3/1987 | Tellan et al. | |
| 4,665,341 | 5/1987 | Imamura et al. | |
| 4,839,564 | 6/1989 | Ide et al. | |
| 4,922,157 | 5/1990 | Van Engen | 315/248 |

Primary Examiner—Eugene R. LaRoche
Assistant Examiner—Amir Zarabian
Attorney, Agent, or Firm—Carlo S. Bessone

[57] ABSTRACT

An integrated light source for use in a large scale video display. The light source includes a cylindrical housing containing at least one electrodeless fluorescent lamp and a circuit for starting and operating the lamp. The circuit includes a radio-frequency generator whose output is capacitively coupled to the electrodeless lamp by means of a pair of coupling members mounted adjacent the exterior surface of the lamp's envelope. A strong electric field produced between the coupling members is sufficient to cause breakdown and excitation of the electrodeless lamp fill material. In a preferred embodiment, a circuit coupled to the input of the radio-frequency generator controls operation of the lamp in response to a low voltage control signal. The integrated light source of the present invention overcomes problems in the prior art of premature lamp life due to failures of the electrode or the glass to metal seal.

22 Claims, 2 Drawing Sheets

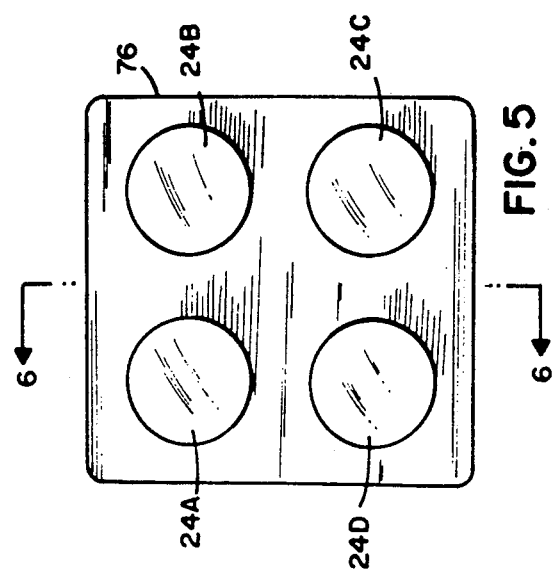
FIG. 5
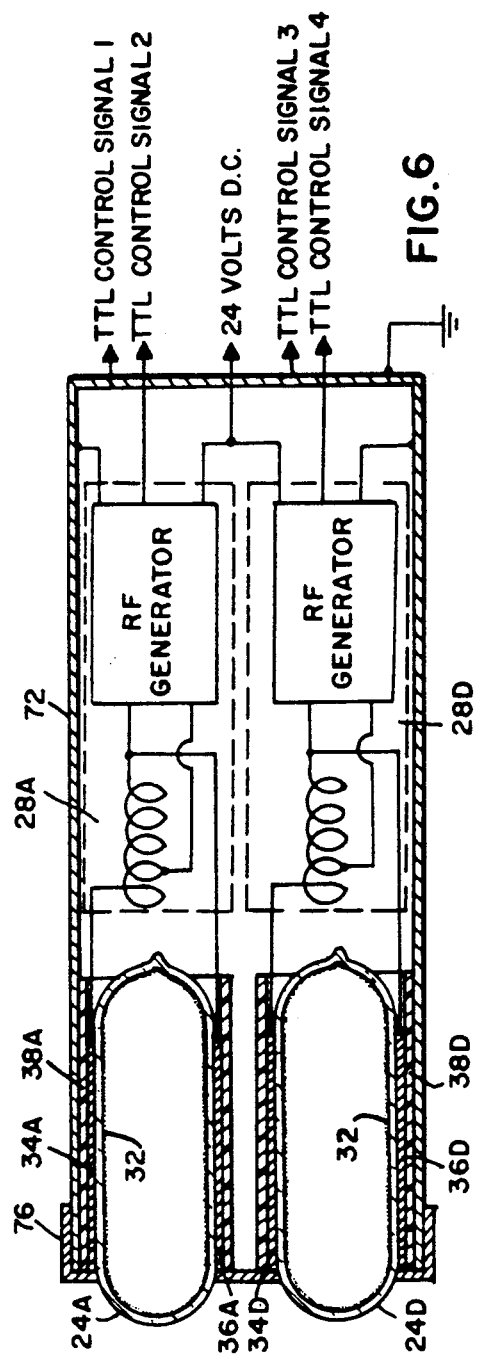
FIG. 4
FIG. 6

INTEGRATED RADIO-FREQUENCY LIGHT SOURCE FOR LARGE SCALE DISPLAY

CROSS-REFERENCE TO A RELATED APPLICATION

This application discloses, but does not claim, inventions which are claimed in copending U.S. Ser. No. 292,786 filed Jan. 3, 1989 and assigned to GTE Laboratories Incorporated.

FIELD OF THE INVENTION

This invention relates in general to large scale video displays of information, data, images and the like, and pertains, more particularly, to such displays having an array of electrodeless lamps arranged as pixels.

BACKGROUND OF THE INVENTION

Application for such lamp arrays include display boards for advertising and instant replay of information in sports stadiums. One type of such array includes the use of a large number of fluorescent lamps which are arranged in groups of three or more to form pixels. Each pixel contains a light source for each of the primary colors, i.e., blue, red and green. The selective excitation of each pixel in an array of many thousand pixels can provide images similar to television images to observers located at some distance. The relative excitation of the primary color sources within each pixel determines the color which the observer perceives as emanating from that pixel, and, in the aggregate, the color information necessary to perceive entire images in color. Each lamp is coated with a primary color phosphor to emit blue, red or green light.

In the prior art, each lamp contains at least one cathode chosen from the conventional art of fluorescent lamp making. The cathode is suitably impregnated with low work function material, and is a copious source of emitted electrons when raised to some elevated temperature. The lamps also contain a noble gas, e.g., argon, at a low pressure (typically, a few torr) and a small quantity of mercury. Electrons are emitted by the cathode and are accelerated by a voltage applied between the cathode and an anode. Some of the electrons undergo collisions which result in the excitation of mercury atoms, which then emit ultraviolet light at 254 nanometers. This radiation is converted by the phosphor to produce colored light. The anode serves as a collector of the charge flowing in the fluorescent tube and is the electrode which supplies voltage which controls the quantity of electron current, the intensity of the 254 nanometer emission, and therefore, the brightness of the light emitted by the individual pixel element.

Examples of fluorescent lamps or lamp arrays suitable for use in video displays are found in U.S. Pat. Nos. 4,559,480 (Nobs); 4,649,322 (Tellan et al) and 4,665,341 (Imamura et al). Each lamp or lamp array taught in these patents contain at least a pair of electrodes.

One difficulty in using such fluorescent lamps relates to the deleterious effect of the cathode emissive material, which is gradually evaporated at the required elevated temperature and is subsequently deposited on the walls of the phosphor coated lamp. This is one of several mechanisms which gradually diminish the light output of the lamp and is one which is particularly troublesome in lamps of very small dimension. In the large scale display application this gradual dimming is troublesome because of the degradation of image quality, particularly where it may occur on time scales of a few hundred hours. Any imbalance in the aging process can produce uneven image brightness or color and lamp replacements may stand out as exceedingly bright pixels.

Another potential problem area in conventional fluorescent lamp technology is the glass to metal seals employed. While this is a well established technology and can be accomplished with a great deal of reliability, the use of as many as one hundred thousand lamps in a single display places unusually rigid demands on reliability of these seals as well as the electrode structures which they support.

It is clear that there is a need for a display which uses lamps having improved reliability and which are extremely slow to deteriorate.

The individual lamps commonly used are typically operated at power levels near 1 watt. Accordingly, each lamp must be individually supplied with power of this amount totalling as much as 10 to 100 kilowatts for a typical large display. Depending on the requirements of the individual lamps for cathode heating or pre-heating, additional wiring may be required. Power circuitry is costly and complex making construction and repair difficult. A need, therefore, also exists for reduction in the cost and complexity of the wiring and, socketing of the light emitting pixel.

SUMMARY OF THE INVENTION

It is, therefore, an object of the present invention to obviate the disadvantages of the prior art.

It is still another object of the invention to provide a compact light source for a video display having high reliability and long operating life.

It is another object of the invention to provide a video display which is energy efficient and which may be constructed at low cost.

These objects are accomplished in one aspect of the invention by the provision of a light source for a video display including a cylindrical housing containing an electrodeless lamp and a circuit for starting and operating the lamp. The circuit includes a RF generator for producing RF energy. The electrodeless lamp includes a tubular envelope having a major portion thereof enclosed within the housing and a minor portion extending outwardly from the housing. Means for coupling RF energy from the RF generator to the electrodeless lamp is located within housing proximate the major portion of the tubular envelope.

In accordance with further teachings of the present invention, the RF generator includes a semiconductor oscillator having an input terminal. Preferably, the starting and operating circuit further includes a control circuit coupled to the input terminal of the semiconductor oscillator for starting and interrupting operation of the oscillator.

In accordance with further aspects of the present invention, the control means includes a bipolar or MOSFET transistor having a base coupled to a control signal and having collector-emitter leads coupled in parallel with the input terminal of the semiconductor switch whereby conduction of the oscillator is interrupted in response to the control signal.

In accordance with still further teachings of the present invention, the coupling means includes a pair of opposing C-shaped members. Preferably, a cylindrically-shaped insulating member is coaxially disposed between the opposing coupling members and the housing.

The above objects are accomplished in another aspect of the invention by the provision of a light source wherein a plurality of electrodeless lamps are contained within a cylindrical housing. A plurality of individual circuits for starting and operating respective lamps are also contained within the housing.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein:

FIG. 4 is a diagram of a circuit for starting and operating an electrodeless lamp according to the present invention;

FIG. 5 is a top view of a second embodiment of a light source for use in the video display of FIG. 1; and FIG. 6 is longitudinal cross sectional view of the light source in FIG. 5 taken along the line 6—6.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
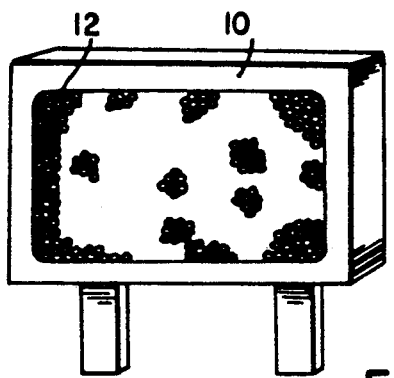
FIG. 1 represents a front elevational view of a video display containing a plurality of light sources according to an embodiment of the present invention.

Referring to the drawings, FIG. 1 illustrates a perspective view of a video display board 10 containing a plurality of light sources 12 according to an embodiment of the present invention. Such a video display board is useful for advertising and instant replay of information as, for example, in a sports stadium. Individual light sources may be arranged, for example, in groups of three (or more) to form one of many thousands of pixels. The source of light in a pixel provides one of the three primary colors. The relative excitation of the primary colors from each pixel determines the color which is perceived by an observer as emanating from that pixel, and, in the aggregate, the color information necessary to perceive entire images in color.

Figure 2:
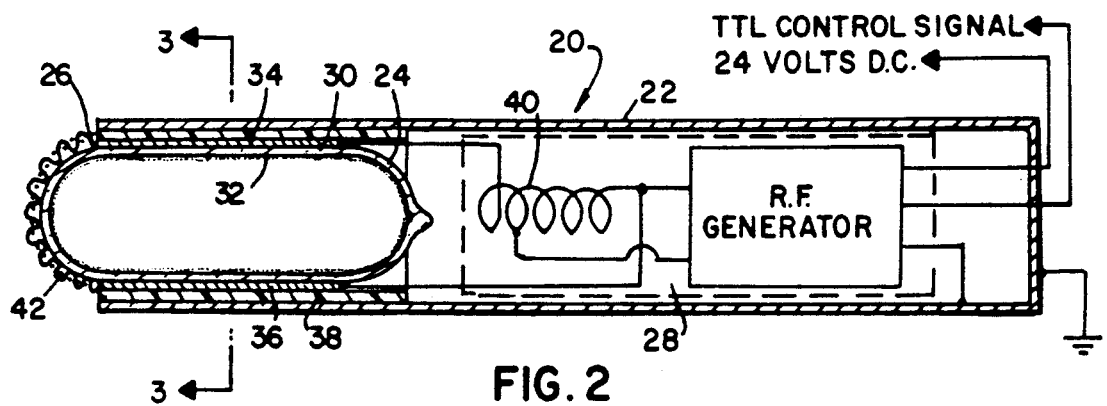
FIG. 2 is a cross sectional side view of a first embodiment of a light source for use in the video display of FIG. 1.
Figure 3:
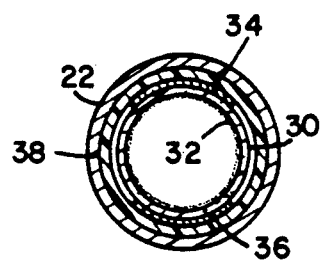
FIG. 3 is a cross sectional view of the light source in FIG. 2 taken along the line 3—3.

A light source for use in the video display according to a first embodiment of the present invention will be described with particular reference to FIGS. 2 and 3. The light source, generally designated 20, includes a cylindrical housing 22 made of, for example, a non-light transmitting material. Preferably, the housing is formed of a metal, such as aluminum. An electrodeless lamp 24 is contained within an opening 26 at one end of cylindrical housing 22. Further contained within housing 22 is a circuit 28 for starting and operating lamp 24. Circuit 28 includes an RF oscillator for producing RF energy. The RF energy is stepped-up by a RF transformer 40 and coupled to lamp 24.

Each electrodeless lamp 24 is formed from a tubular envelope 30 containing a fill material composed of a noble gas at low pressure and a quantity of mercury. As best illustrated in FIG. 2, a major portion of electrodeless lamp 24 is enclosed within housing 22 while the remaining minor portion thereof extends from the housing. Excitation of the fill material by a discharge within the envelope produces ultraviolet light which excites an internal phosphor coating 32 to emit visible light at spectral regions which are governed by the composition of the phosphor. Either the entire interior surface of the envelope or only that portion which extends external to the housing is coated with a suitable phosphor.

The output of circuit 28 is coupled to the external surface of the lamp's envelope 30 by means of two coupling members 34, 36 oppositely disposed proximate the major portion of lamp envelope 30 enclosed within housing 22. Coupling members 34, 36 are formed of a conductive material and, as best illustrated in FIG. 3, preferably have a C-shape configuration to conform to the cross sectional shape of the envelope. In the case where housing 22 is formed of metal, an insulating material 38 is coaxially disposed between coupling members 34, 36 and the portion of housing 22 adjacent the opening 26. To prevent radio-frequency interference (RFI), a conductive mesh 42 may cover the minor portion of the lamp envelope which extends remote from housing 22. Mesh 42 is electrically connected to metallic housing 22 which is at ground potential.

The light source of the present invention wherein the major portion of an electrodeless lamp is enclosed within the housing, results in compact light source in which the overall length can be substantially reduced.

FIG. 4 represents a circuit diagram of a preferred embodiment of a circuit 28 for starting and operating electrodeless lamp 24. In a preferred embodiment, circuit 28 consists of an RF generator 46 containing an RF oscillator whose output is coupled to electrodeless lamp 24 and a control circuit 48 for starting and interrupting operation of RF generator 46 in response to an input control signal so as to provide pulse-width modulation and thereby control the averaged light output from the RF lamp.

A 24 volt direct current source is connected to a voltage divider network consisting of resistors R50 and R52. The base or input terminal of a transistor oscillator Q54 is connected to the junction of resistors R50 and R52. The emitter of transistor Q54 is connected to ground through a bias resistor R56. The collector of transistor Q54 is connected to the d.c. source through an inductor L58. The junction of the collector of transistor Q54 and inductor L58 is connected to ground through a capacitor C60 and to the center tap of a RF output transformer T62. One terminal of RF transformer T62 is connected to one of the lamp coupling members 34. The other terminal of RF transformer T62 is connected to the other lamp coupling member 36, one end of a capacitor C68 and one end of a capacitor C70. The other end of capacitor C68 is connected to ground while the other end of capacitor C70 is connected to the base of transistor Q54.

The frequency of the RF oscillator is chosen by proper selection of 40 megahertz. A suitable frequency for the oscillator is from about 10 to 100 megahertz.

The operation of the RF oscillator and, consequently, lamp 24 is controlled by the portion of circuit 28 designated as 48. Control circuit 48 includes a single transistor Q64 having a collector connected directly to the base of transistor Q54 and an emitter connected to ground. The base of transistor Q64 is connected to ground through the parallel combination of a resistor R66 and a capacitor C68. A transistor-transistor-logic (TTL) control signal is connect through a voltage divide resistor R70 to the base of transistor Q64.

In operation, a high frequency voltage generated by the RF oscillator is developed across the primary windings of transformer T62. This voltage is subsequently increased by the secondary windings of transformer T62 to approximately 100 volts and coupled to electrodeless lamp 24 by way of lamp coupling members 34 and 36. When power is applied to circuit 28, the RF oscillator is free running causing lamp 24 to remain lit while transistor Q64 is not conducting. Transistor Q64 is not conducting when the input control signal is less than about 1 volt. A control signal of, for example, 2 volts coupled to the base of transistor Q64 causes conduction thereof. As a result, base drive current to transistor Q54 is shunted to ground through the collector-emitter junction of transistor Q64. As a result, conduction of the oscillator is interrupted and lamp 24 is extinguished.

As a specific example but in no way to be construed as a limitation, the following components contained in TABLE 1 are appropriate to an embodiment of the present disclosure, as illustrated by FIG. 4.

TABLE 1

| Item | Description | Value |
|------|-------------|-------|
| R50 | Resistor | 24 Kohm |
| R52 | Resistor | 1 Kohm |
| R56 | Resistor | 10 ohm |
| R66 | Resistor | 1.5 Kohm |
| R70 | Resistor | 2 Kohm |
| C60 | Capacitor | 30 PFD |
| C68 | Capacitor | 12 PFD |
| C70 | Capacitor | 10 PFD |
| C72 | Capacitor | 0.001 uF |
| Q54 | Transistor | SK 9041 |
| Q64 | Transistor | 2N 5210 |
| L58 | Inductor | 0.8 uH |
| T62 | RF Transformer | 15 + 15 T AWG #24 6.3 mm coil diameter |

A second embodiment of a light source for use in a video display is illustrated in FIGS. 5 and 6. As shown, the light source includes four electrodeless lamp 24A, 24B, 24C and 24D (FIG. 5). Lamps 24A, 24B, 24C and 24D are coated with an internal layer of a phosphor 32 which produces either red, green or blue. Individual circuits 28A, 28B, 28C and 28D (only 28A and 28D are shown in FIG. 6) for starting and operating the lamps with each including an RF generator are respectively coupled to lamps 24A, 24B, 24C and 24D. In a manner similar to that shown in FIGS. 2 and 3, the output of circuits 28A, 28B, 28C and 28D are respectively coupled to the external surface of the individual lamp by means of two coupling members 34A, 36A; 34B, 36B; 34C, 36C; and 34D, 36D (only 34A, 36A, 34D and 36D are shown in FIG. 6). Also shown in FIG. 6 are insulating material 38A and 38D coaxially disposed around lamps 24A and 24D, respectively.

A cylindrical housing 72 is disposed around the lamps and RF generators so as to form an integral unit. A cap 76 having four apertures to receive the four electrodeless lamps is retained over one end of housing 72. The other end of housing 72 is provided with terminals for receiving d.c. power and the individual TTL control signals.

There has thus been shown and described an improved light source for use with a video display. The light source is highly reliable and has a relatively long life. The resulting video display is energy efficient may cost less than prior art displays. The light sources are compact in size which may permit a decrease in depth of the video display. In addition, the use of TTL signals to control each lamp eliminates the need for a- power semiconductor (e.g., power transistor) as is the case in previous displays based on electroded fluorescent lamps.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A light source for a video display comprising:
   a cylindrical housing;
   an electrodeless lamp including a tubular envelope having a major portion thereof enclosed within said housing and a minor portion extending outwardly from said housing;
   circuit means disposed within said housing for starting and operating said electrodeless lamp and including RF generator means for producing RF energy, said RF generator means including an oscillator means comprising a semiconductor switch having an input terminal and control means coupled to said input terminal of said semiconductor switch, said control means adapted to receive a control signal whereby conduction of said oscillator means is interrupted in response to said control signal; and
   means for coupling said RF energy from said RF generator means to said electrodeless lamp, said coupling means located within said housing and proximate said major portion of said tubular envelope.

2. The light source of claim 1 wherein said control means includes a bipolar transistor having a base coupled to said control signal and having collector-emitter leads coupled in parallel with said input terminal of said semiconductor switch.

3. The light source of claim 1 wherein said oscillator means generates a high frequency of from 10 to 100 megahertz.

4. The light source of claim 1 wherein said coupling means includes a pair of opposing members.

5. The light source of claim 4 wherein each of said opposing members is C-shaped.

6. The light source of claim 5 further including insulating means coaxially disposed between said opposing members and said housing.

7. The light source of claim 6 wherein said insulating means includes a cylindrically-shaped insulating member.

8. A video display comprising a plurality of light sources, each of said light sources comprising a cylindrical housing, an electrodeless lamp including a tubular envelope having a major portion thereof enclosed within said housing and a minor portion extending outwardly from said housing, a circuit for starting and operating the electrodeless lamp disposed within said housing and including RF generator means for producing RF energy, said RF generator means including an oscillator means comprising a semiconductor switch having an input terminal, and control means coupled to said input terminal, and control means coupled to said input terminal of said semiconductor switch, said control means adapted to receive a control signal whereby conduction of said oscillator means is interrupted in response to said control signal, and means for coupling RF energy from said RF generator means to said electrodeless lamp, said coupling means located within said housing and proximate said major portion of said tubular envelope.

9. The video display of claim 8 wherein said control means includes a bipolar or FET transistor having a base coupled to a control signal and having collector-emitter leads coupled in parallel with said input terminal of said semiconductor switch.

10. The video display of claim 8 wherein said oscillator means generates a high frequency of from 10 to 100 megahertz.

11. The video display of claim 8 wherein said coupling means includes a pair of opposing members.

12. The video display of claim 11 wherein each of said opposing members is C-shaped.

13. The video display of claim 12 further including insulating means coaxially disposed between said opposing members and said housing.

14. The video display of claim 13 wherein said insulating means includes a cylindrically-shaped insulating member.

15. A light source for a video display comprising:
a cylindrical housing;
a plurality of electrodeless lamps, each including a tubular envelope having a major portion thereof enclosed within said housing and a minor portion extending outwardly from said housing;
circuit means for starting and operating said plurality of electrodeless lamps disposed within said housing, said circuit means including a plurality of RF generator means for producing RF energy, each of said RF generator means being coupled to a respective one of said electrodeless lamps; and
means for coupling RF energy from each of said RF generator means to a respective one of said electrodeless lamps, said coupling means located within said housing and proximate said major portion of the tubular envelope of each of said electrodeless lamps.

16. The light source of claim 15 wherein each of said RF generator means includes an oscillator means comprising a semiconductor switch having an input terminal, and a control means coupled to said input terminal of said semiconductor switch of said oscillator means for interrupting said oscillator means.

17. The light source of claim 16 wherein said control means includes a bipolar transistor having a base coupled to said control signal and having collector-emitter leads coupled in parallel with said input terminal of said semiconductor switch.

18. The light source of claim 16 wherein said oscillator means generates a high frequency of from 10 to 100 megahertz.

19. The light source of claim 15 wherein said coupling means includes a pair of opposing members.

20. The light source of claim 19 wherein each of said opposing members is C-shaped.

21. The light source of claim 20 further including insulating means coaxially disposed between said opposing members and said housing.

22. The light source of claim 21 wherein said insulating means includes a cylindrically-shaped insulating member.

* * * * *